(12) United States Patent
Sagiya et al.

(10) Patent No.: US 7,301,661 B2
(45) Date of Patent: Nov. 27, 2007

(54) COMMUNICATION TERMINAL DEVICE AND METHOD OF CONTROLLING SAME

(75) Inventors: Yoshiharu Sagiya, Iwatsuki (JP); Yoshihiro Maei, Iwatsuki (JP); Hideki Fujii, Iwatsuki (JP); Hirotaka Kawabata, Iwatsuki (JP); Kazutaka Saitoh, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 931 days.

(21) Appl. No.: 10/373,808

(22) Filed: Feb. 27, 2003

(65) Prior Publication Data

US 2004/0051900 A1    Mar. 18, 2004

(30) Foreign Application Priority Data

Sep. 17, 2002    (JP)    ............................. 2002-270087

(51) Int. Cl.
- G06F 11/30 (2006.01)
- G06F 15/00 (2006.01)
- H04N 1/00 (2006.01)
- H04N 1/32 (2006.01)

(52) U.S. Cl. ..................... 358/1.15; 358/1.16; 358/441; 358/434; 379/209.01; 379/207.05; 379/207.1; 370/236; 370/242; 709/228; 709/229

(58) Field of Classification Search ............... 358/1.15, 358/440, 403, 468, 400, 1.16, 441–444, 434, 358/438; 370/352, 236, 242, 346, 377, 395.2; 455/417; 379/209.01, 207.05–207.09, 207.1; 709/228, 229

See application file for complete search history.

(56) References Cited

U.S. PATENT DOCUMENTS

| | | | | |
|---|---|---|---|---|
| 4,994,926 A | * | 2/1991 | Gordon et al. | 358/400 |
| 5,392,131 A | * | 2/1995 | Umeno | 358/403 |
| 5,438,433 A | * | 8/1995 | Reifman et al. | 358/468 |
| 6,122,074 A | * | 9/2000 | Jeon et al. | 358/440 |
| 6,393,502 B1 | * | 5/2002 | Meyer et al. | 710/58 |
| 6,771,639 B1 | * | 8/2004 | Holden | 370/352 |
| 2002/0187777 A1 | * | 12/2002 | Osterhout et al. | 455/417 |

FOREIGN PATENT DOCUMENTS

| | | |
|---|---|---|
| JP | A 62-274952 | 11/1987 |
| JP | A-3-274961 | 12/1991 |
| JP | A-5-14669 | 1/1993 |
| JP | A-5-191501 | 7/1993 |
| JP | A-5-252305 | 9/1993 |
| JP | A-2001-251424 | 9/2001 |

OTHER PUBLICATIONS

RFC 3261, SIP: Session Initiation Protocol, Jun. 2002.

* cited by examiner

*Primary Examiner*—Aung S. Moe
*Assistant Examiner*—Scott A. Schlack
(74) *Attorney, Agent, or Firm*—Oliff & Berridge, PLC

(57) ABSTRACT

A communication terminal device which comprises an SIP call control unit that performs call control by using an SIP (Session Initiation Protocol), a recognition unit that recognizes that a calling has become an error according to a response signal sent back from a called party terminal after making the call according to the SIP call control procedure, a redial management unit that manages a redial interval to make a redial when the calling has become an error, and a redial control unit that performs redial control according to redial information when the calling has become an error and the response signal contains the redial information.

16 Claims, 14 Drawing Sheets

RESPONSE CODE CONTAINING RETRY-AFTER

Client-Error =
- / "404" ; Not Found
- / "413" ; Request Entity Too Large
- / "480" ; Temporarily not available
- / "486" ; Busy Here Server-Error =
- / "500" ; Internal Server Error
- / "503" ; Service Unavailable Global-Failure =
- / "600" ; Busy Everywhere
- / "603" ; Decline

DESTINATION INFORMATION 0501112222 RECEIVED
THE FOLLOWING INFORMATION FROM THE CALLED PARTY
10 MINUTES AGO AND TERMINATED AS ERROR.

**CALLING UNACCEPTABLE
WITHIN ONE HOUR.**

IS PROCESSING CONTINUED ?

YES    NO    RESERVATION

FIG.11

DESTINATION INFORMATION 0501113333 RECEIVED
THE FOLLOWING ERROR INFORMATION FROM
THE CALLED PARTY AT 10:30 AND ANOTHER COMMUNICATION
IS WAITING FOR REDIALING.

**CALLING UNACCEPTABLE
WITHIN ONE HOUR.**

IS PROCESSING CONTINUED ?

[ YES ]    [ NO ]    [ RESERVATION ]

FIG.14

COMMUNICATION TERMINAL DEVICE AND METHOD OF CONTROLLING SAME

BACKGROUND OF THE INVENTION

1. Field of the Invention

The present invention relates to a communication terminal device which uses an SIP (Session Initiation Protocol) to perform call control and its control method, and more particularly to a communication terminal device which performs redial control by utilizing redial information sent from a called terminal through a call control procedure using the SIP and its control method.

2. Description of the Related Art

Facsimile machines generally have a function to redial for a prescribed number of times with prescribed time intervals when a call is made but the party on the called end of the line is busy.

Such a redial control function generally uses a method by which a calling terminal manages redial intervals and the number of redialing, and the redial control is performed under the leadership of the calling terminal.

As a known example of such a type of redial control, there is Japanese Patent Laid-Open Publication No. 62-274952 which manages a primary number of redialing and a secondary number of redialing by the calling terminal.

The above-described facsimile machine cannot confirm if the called terminal responds to redialing. Because, the called terminal did not have an effective unit to inform the calling terminal when the called terminal became ready to receive a call.

Meanwhile, facsimile machines using the SIP for call control are becoming increasing common in these years. The call control using the SIP can send redial information including information about when acceptance of a call becomes available from the called terminal to the calling terminal if the called terminal is busy.

When the calling terminal controls the redial intervals and the number of redialing in the same way as the conventional facsimile machines, however, redial information transmitted from the called terminal could not be used.

Therefore, the conventional mainstream of managing the redial intervals and the number of redialing by the calling terminal to control redialing is still popular, there are lots of useless redialing, and a success rate of communications is low.

As described above, the conventional facsimile machines manage the redial intervals and the number of redialing by the calling terminal, redial information sent from the called terminal through the call control procedure using the SIP cannot be used, and the redial control must be performed under the leadership of the calling terminal. Therefore, there were disadvantages that redial control was made-many times uselessly and a probability of success in communications was low.

The present invention has been made to remedy the above problems and to provide a communication terminal device which can make redial control considering incoming call acceptable conditions of the called terminal by using redial information sent from the called terminal through call control procedure using the SIP and can reduce useless redialing and improve a probability of success in communications, and its control method.

SUMMARY OF THE INVENTION

To achieve the above object, the present invention according to an aspect is a communication terminal device comprising:

an SIP call control unit which performs call control by using an SIP (Session Initiation Protocol);

a recognition unit which recognizes that a calling has become an error according to a response signal sent back from a called party terminal after making the call according to the SIP call control procedure;

a redial management unit which manages a redial interval to make a redial when the calling has become an error; and a redial control unit which performs redial control according to redial information when the calling has become an error and the response signal contains the redial information.

Another aspect of the invention is a method of controlling a communication terminal device for making call control by using an SIP (Session Initiation Protocol), comprising:

recognizing that a calling has become an error according to a response signal sent back from a called party terminal after making a call according to the SIP call control procedure;

managing a redial interval for redialing when the calling has become an error; and making redial control according to redial information when the redial information is contained in the response signal when the calling has become an error.

According to the present invention, after calling according the call control procedure using the SIP, it is known whether the calling has become an error or not according to a response signal sent back from the called terminal, and when the calling has become an error and the response signal contains redial information, redial control is performed according to the redial information. Therefore, redialing can be performed in conformity with the incoming call acceptable conditions or the like of the called terminal known from the redial information, useless redialing can be reduced, and a probability of success in communications can be improved remarkably.

BRIEF DESCRIPTION OF THE DRAWINGS

Preferred embodiments of the present invention will be described in detail based on the following figures, wherein:

FIG. 2 is a chart showing a list of response codes including Retry-After;

FIG. 11 is a diagram showing an example of a call confirmation screen according to the fifth embodiment;

FIG. 14 is a diagram showing an example of a call confirmation screen according to the sixth embodiment.

DESCRIPTION OF THE PREFERRED EMBODIMENTS

Embodiments of the present invention will be described in detail with reference to the accompanying drawings.

Figure 1:
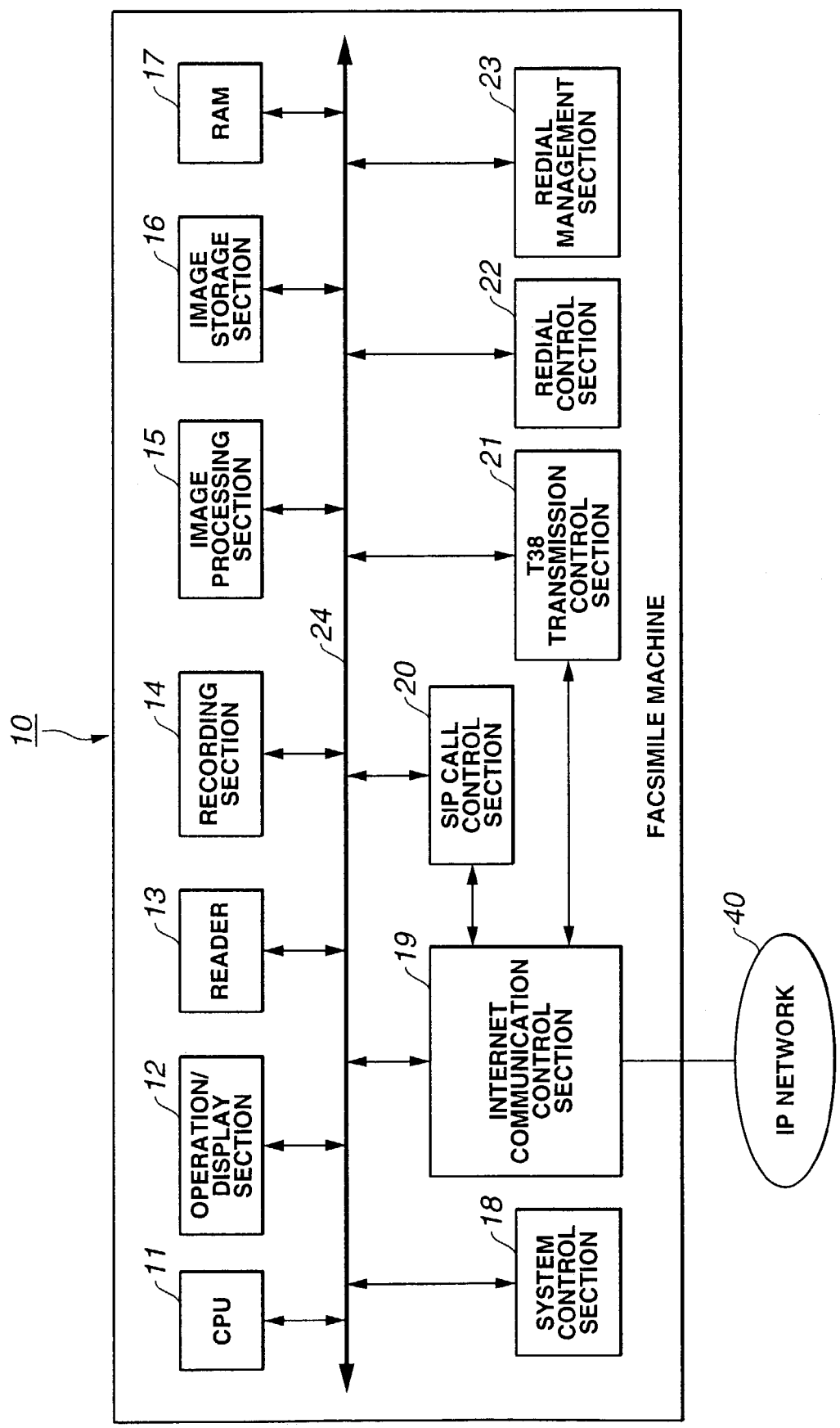
FIG. 1 is a block diagram showing a system structure of the facsimile machine according to the present invention.

FIG. 1 is a block diagram showing a system structure of the facsimile machine according to the present invention.

This facsimile machine 10 comprises a central processing unit (CPU) 11 for controlling the machine as a whole, an operation/display section 12 which is formed of a touch panel and used by a user to make various operations (such as a calling operation) so to operate the machine and indicate a variety of information, a reader 13 which reads a sending original or an original for copying, a recording section 14 which records received image data or read image data on recording paper and outputs, an image processing section 15 which processes the image data for encoding, decoding, enlargement, reduction and the like, an image storage section 16 which stores the received image data or read image data, a RAM 17 which becomes a work area (to store a variety of information and the system data for controlling the operation of the machine) used for a control program, a system control section 18 which has a program (ROM) for controlling the entire facsimile, an Internet communication control section 19 which is connected to an IP (Internet Protocol) network 40 and makes communication control for sending or receiving a variety of data on the Internet via the IP network 40, an SIP call control section 20 which uses the procedure specified in RFC3261 (SIP: Session Initiation Protocol) and RFC2327 (SDP: Session Description Protocol) of IETF (Internet Engineering Task Force) to make control of establishment, maintenance and termination of a call of a real-time type Internet FAX T38, a T.38 transmission control section 21 which controls a real time communication protocol according to an ITU-T recommendation T.38 procedure, a redial control section 22 which judges whether redial can be made by considering redial starting conditions from the redial intervals and the number of redialing if the called terminal is busy when called, a redial management section 23 which stores specified values such as redial intervals and the number of redialing necessary for redial control by the redial control section 22 and manages data, and a system bus 24 which exchange data among the respective sections of the machine.

When the facsimile machine 10 operates as a calling terminal, the SIP is used by the SIP call control section 20 to make call control so to establish a call with the called terminal and communicates with the called terminal by the T.38 transmission control section 21 and Internet communication control section 19.

In the call control procedure using the SIP, the calling terminal uses an INVITE command (SIP procedure signal) to call a destination party terminal.

Meanwhile, at the time of INVITE request from the calling terminal, the called terminal can send back a variety of information such as information indicating operation conditions of the originating terminal to the calling terminal.

As information which can be informed by called terminal the to the calling terminal in response to the INVITE request, there are, for example, information which indicates that the originating terminal is busy, error information, or information about predicted time between the termination of a busy or error state and incoming call acceptable time.

If it was busy for example when the INVITE request was made by the calling terminal, the aforesaid incoming call acceptable time t is sent back as data "Retry-After t" to the calling terminal.

Specifically, the data "Retry-After t" is added as a Retry-After header field to a response signal (response) indicating busy and sent back to the calling terminal.

As a response which can contain the Retry-After, there is other than the above response indicating busy.

FIG. 2 is a chart showing a list of response codes containing Retry-After.

It is seen from the chart that the response codes containing Retry-After include one relating to Client-Error, one relating to Server-Error and one relating to Global-Error.

As the response code relating to Client-Error, there are status codes in the 400 range, such as "404", "413", "480", "486" and the like.

Among them, the status code "486" is a code for informing the calling terminal that the terminal is busy (Busy Here).

Therefore, when there is an incoming call from the calling terminal and the called terminal is busy, a response which has Retry-After added to the status code 486 (Busy Here) is sent back to the calling terminal.

Thus, the calling terminal having received the response can know from the statues code 486 (Busy Here) that the called terminal is busy and incoming call acceptable time t from Retry-After in it.

In this case, it is seen that the calling terminal has a high possibility of communicating with the called terminal by redialing after a lapse of the above-described incoming call acceptable time t.

From the above viewpoint, the facsimile machine 10 according to the present invention performs redial control according to the received redial information without depending on the redial intervals or the number of redialing determined by the calling terminal when a call is made and if a response sent back from the called terminal includes redial information such as Retry-After.

To realize the redial control, the redial management section 23 of the facsimile machine 10 according to the present invention manages redial information sent back from the called terminal other than information which can be determined by the terminal such as the above-described redial intervals and number of redialing.

Figure 3:
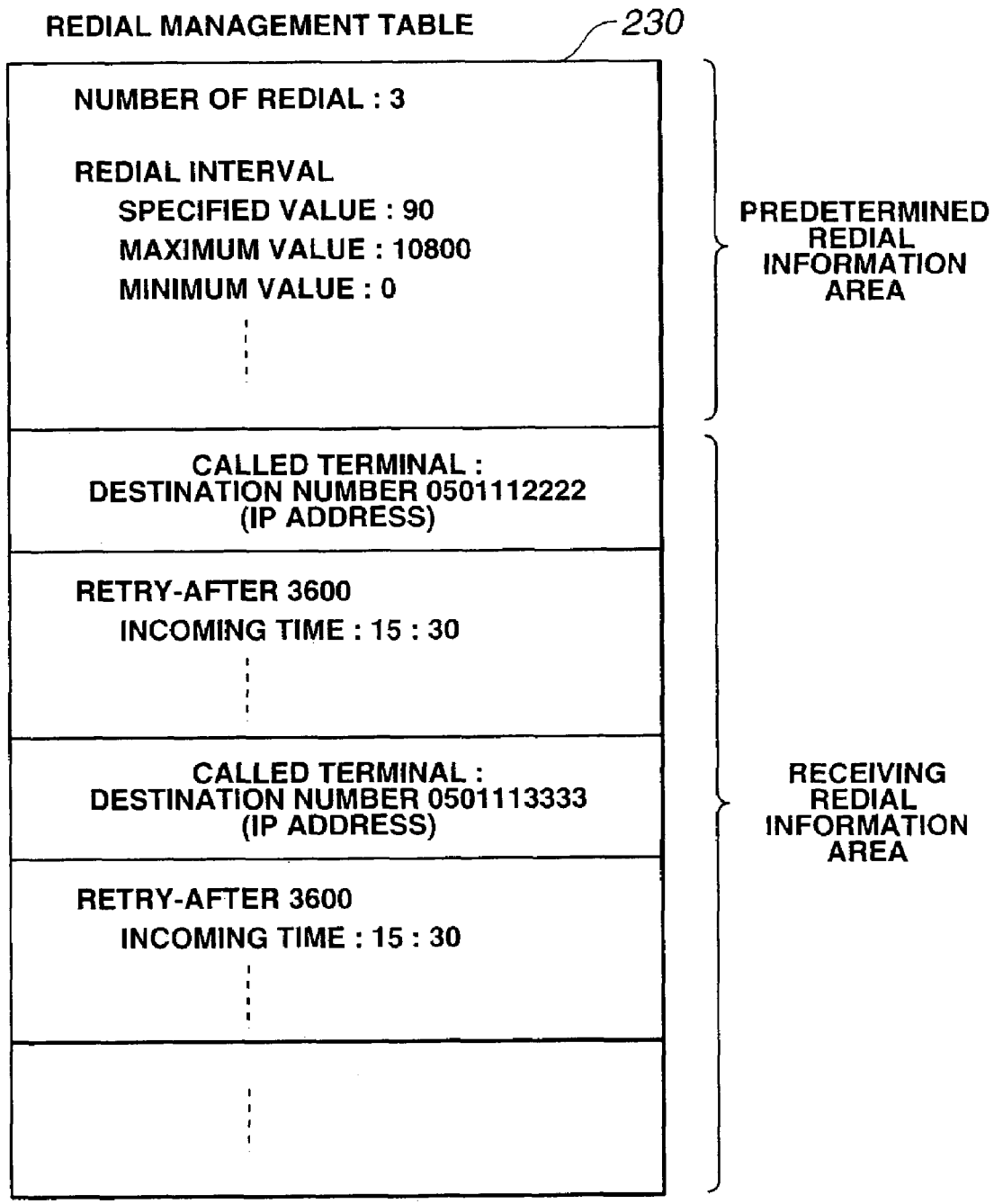
FIG. 3 is a diagram showing an example of redial management table according to the present invention.

FIG. 3 is a diagram showing an example of a redial management table 230 which is provided in the redial management section 23 of the facsimile machine 10 of the present invention.

This redial management table 230 comprises a predetermined redial information area and a receiving redial information area. The predetermined redial information area stores information about the number of redialing and redial intervals (minimum, maximum and specified values) determined by the originating terminal. The receiving redial information area stores redial information such as Retry-After sent back from the destination terminal (called terminal) after calling.

Here, a basic operation of the redial control according to the present invention will be described with reference to the redial control sequence shown in FIG. 4.

Figure 4:
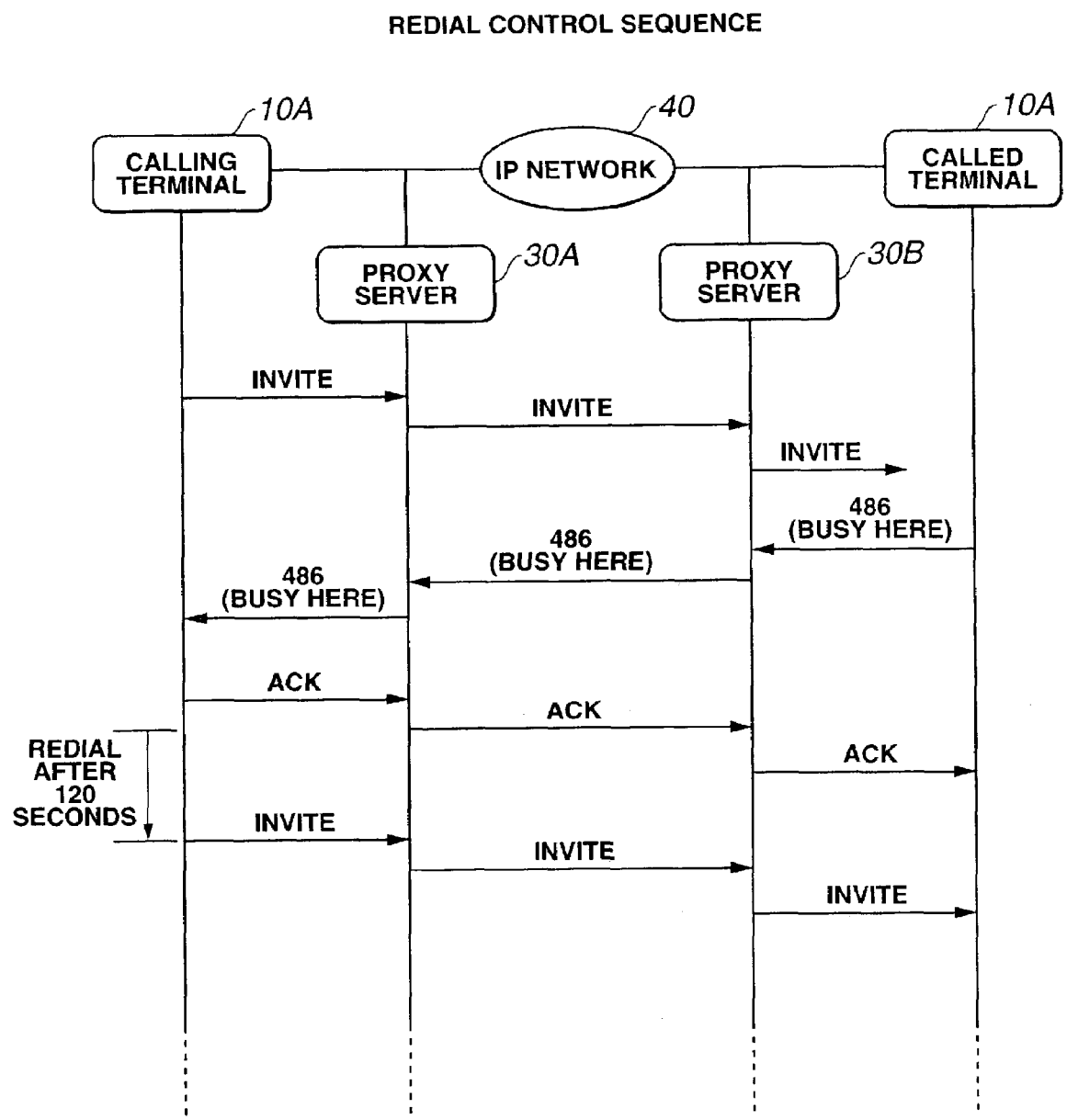
FIG. 4 is a diagram showing a sequence of redial control according to the present invention.

In FIG. 4, a calling terminal 10A and a called terminal 10B use facsimile machine 10 shown in FIG. 1 and have a call control function using the SIP.

First, in the calling terminal 10A, the SIP call control section 20 calls the called terminal 10B according to the calling operation on the operation/display section 12.

When calling, the SIP call control section 20 generates INVITE and gives it to the Internet communication control section 19, and the Internet communication control section 19 sends the INVITE to the called terminal 10B.

The INVITE sent from the calling terminal 10A is first sent to a proxy server 30A, sent to a proxy server 30B on the opposite side via an IP network 40 and delivered to the called terminal 10B.

The called terminal 10B receives the INVITE by the Internet communication control section 19 and sends to the SIP call control section 20.

When the originating terminal is busy, the SIP call control section 20 predicts time when the above-described busy is solved, namely incoming call acceptable time t, and sends a response with Retry-After t (incoming call acceptable time) added to the status code 486 (Busy Here) indicating busy to the calling terminal 10A.

This response [486 (Busy Here)] is sent to the calling terminal 10A by reversing the above-described procedure, received by the Internet communication control section 19 and then sent to the SIP call control section 20.

In the calling terminal 10A, when the SIP call control section 20 receives the response 486 (Busy Here) from the called terminal 10B, a signal "ACK" indicating the completion of reception is sent to the called terminal 10B. This signal "ACK" is sent to the called terminal 10B through the same route as the INVITE and received by the SIP call control section 20 of the called terminal 10B.

In the calling terminal 10A, the SIP call control section 20 gives the response 486 (Busy Here) received from the called terminal 10B to the redial control section 22.

The redial control section 22 recognizes from the status code 486 of the response that the called terminal 10B is busy (a call is error) and also recognizes incoming call acceptable time t from Retry-After information contained in the response, and provides instructions to the SIP call control section 20 after a lapse of the time t to redial to the called terminal 10B.

According to the redial control sequence shown in FIG. 4, Retry-After information contained in the response 486 (Busy Here) received by the calling terminal 10A from the called terminal 10B is a value of incoming call acceptable time t=120 (seconds). Thus, the calling terminal 10A redials (INVITE sending) to the called terminal 10B after a lapse of 120 seconds after sending a response signal "ACK" to the response.

At this time, there is a high possibility that the called terminal 10B is not busy by now. Therefore, redialing by the calling terminal 10A has a very high probability of establishing communications with the called terminal 10B.

Various embodiments of the present invention which makes a call by the call control procedure using the SIP as described above and performs redial control according to redial information sent back from the called terminal will be described.

In the respective embodiments, the facsimile machines 10 have the same basic structure as shown in FIG. 1 except that only the redial control by the redial control section 22 is different.

First Embodiment

Figure 5:
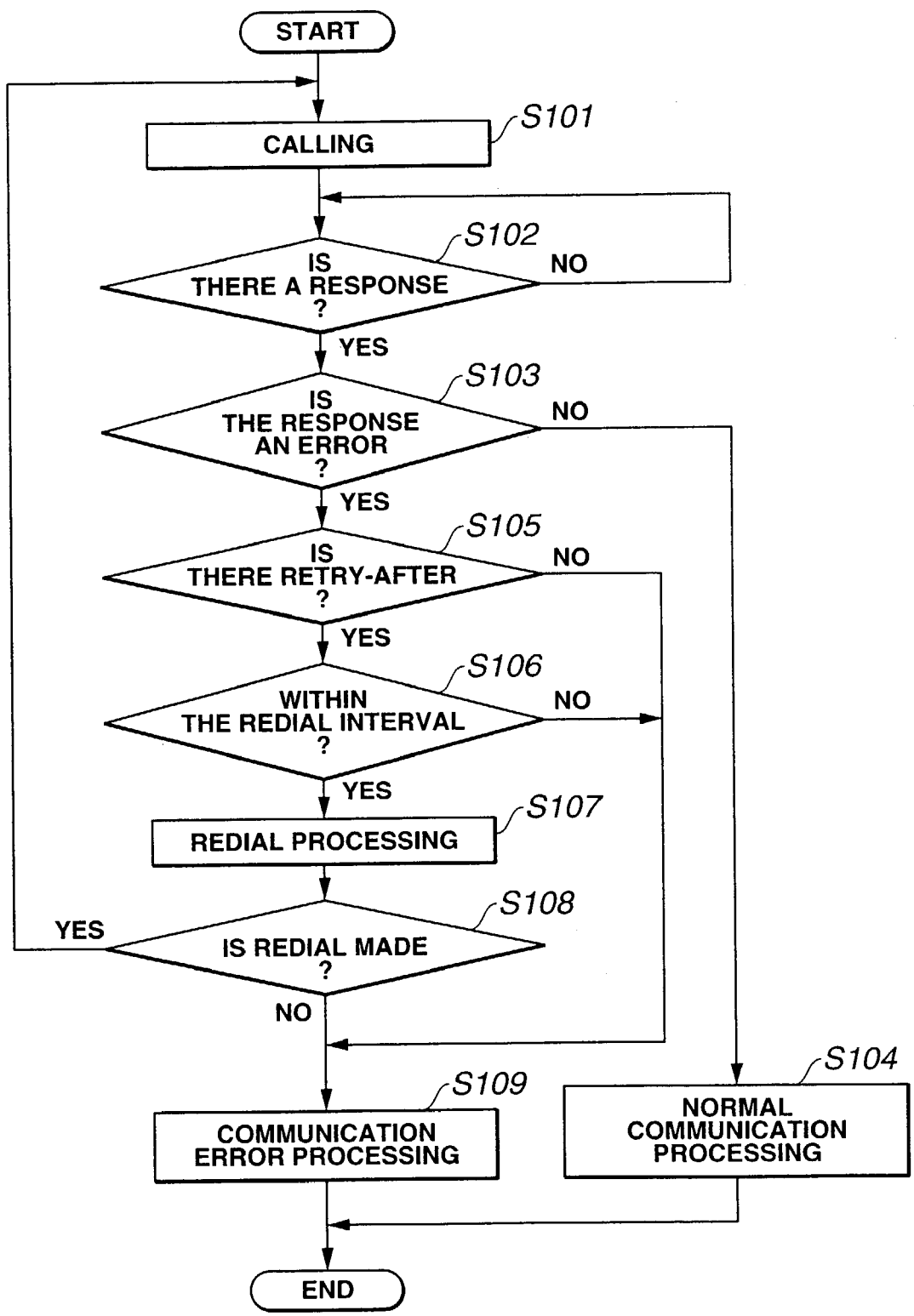
FIG. 5 is a flow chart showing a redial control operation according to a first embodiment.

FIG. 5 is a flow chart showing a redial control operation by the facsimile machine according to the first embodiment.

In the facsimile machine according to the first embodiment, when it operates as the calling terminal 10A shown in FIG. 4, the SIP call control section 20 makes a call (step S101) according to the above-described method and monitors whether there is a response from the called terminal 10B (step S102).

Here, when there is a response (YES in step S102), a status code of the response is referred to in order to check whether it is a response error or not (step S103).

Here, when it is judged not a response error (NO in step S103), normal call control is performed to establish a call, and normal communication processing is performed (step S104).

Meanwhile, when it is judged as a response error because a code 486 (Busy Here) or the like is received (YES in step S103), it is checked whether there is Retry-After (step S105). When there is not Retry-After (NO in step S105), it is noticed to, for example, the system control section 18, and communication error processing corresponding to the response error is performed (step S109).

As the communication error processing, the occurrence of the response error is indicated on the operation/display section 12 according to, for example, a response code (see FIG. 2) contained in the response.

Meanwhile, when there is Retry-After (YES in step S105), the redial control is entrusted to the redial control section 22.

Here, the redial control section 22 recognizes time t from Retry-After t, and refers to the redial intervals previously registered as minimum and maximum values in the redial management section 23 to check whether it is within the redial intervals (step S106).

Here, when it is not within the redial interval (NO in step S106), it is determined not to make redialing, and performs communication error processing (step S109).

As the communication error processing, for example, a message "out of redial intervals" is indicated on the operation/display section 12.

When it is within the redial intervals (YES in step S106), the redial control section 22 starts the redial processing (step S107).

By the redial processing, the redial control section 22 sets the redial timer to a value of time t of Retry-After t and monitors the results of counting the set time t.

When the time t is counted up and "redialing" is determined (YES in step S108), the procedure returns to step S101 to make a call (redial).

The above-described redial control is repeated within a range of number of redial execution until the judgment NO in the step S103 (no response error) is obtained.

When it is judged in the step S103 that it is not a response error (NO in step S103), a call is established through the normal call control to perform normal communication processing (step S104).

And, when it is judged in step S103 that there is a response error and the number of redialing exceeds a prescribed number of times in step S1108, it is judged that "redial is not made" (NO in step S108). And, it is noticed to the system control section 18, communication error processing (step S109) is performed, and processing is terminated.

As the communication error processing through the judgment NO in the step S108, a message, for example, "no response to redialing within the redial intervals" is shown on the operation/display section 12.

In the facsimile machine 10 of the first embodiment for the above-described redialing control operation, it is assumed that the redial management section 23 has, for example, redial interval information of a maximum value=10800 seconds (3 hours) and a minimum value=zero second registered therein (see FIG. 3), and the calling terminal 10A receives 486 (Busy Here) response of "Retry-After 18000" from the called terminal 10B.

In this case, the redial control section 22 determines redial interval from the maximum and minimum values registered in the redial management section 23, it is judged in step S106 that it is not within the redial intervals because 18000 (seconds) is larger than the maximum value (18000>10800) (NO in step S106), and it is instructed to the system control section 18 to perform communication error processing (step S109).

As described above, the redial management section 23 registers the minimum and maximum values of redial intervals in the first embodiment, and when redial information is contained in a response sent back from the called terminal after making a call, redial is not made if the redial information is not within the redial intervals specified by the minimum and maximum values, and it is processed as a communication error.

When the redial information has a value larger than the maximum value of the redial intervals (e.g., three days later), it is useless to redial if it was an urgent FAX.

According to the first embodiment, the communication is terminated as an error to notify the sending party that the receiving party is not available to receive, and notification by another method can be urged.

Second Embodiment

Figure 6:
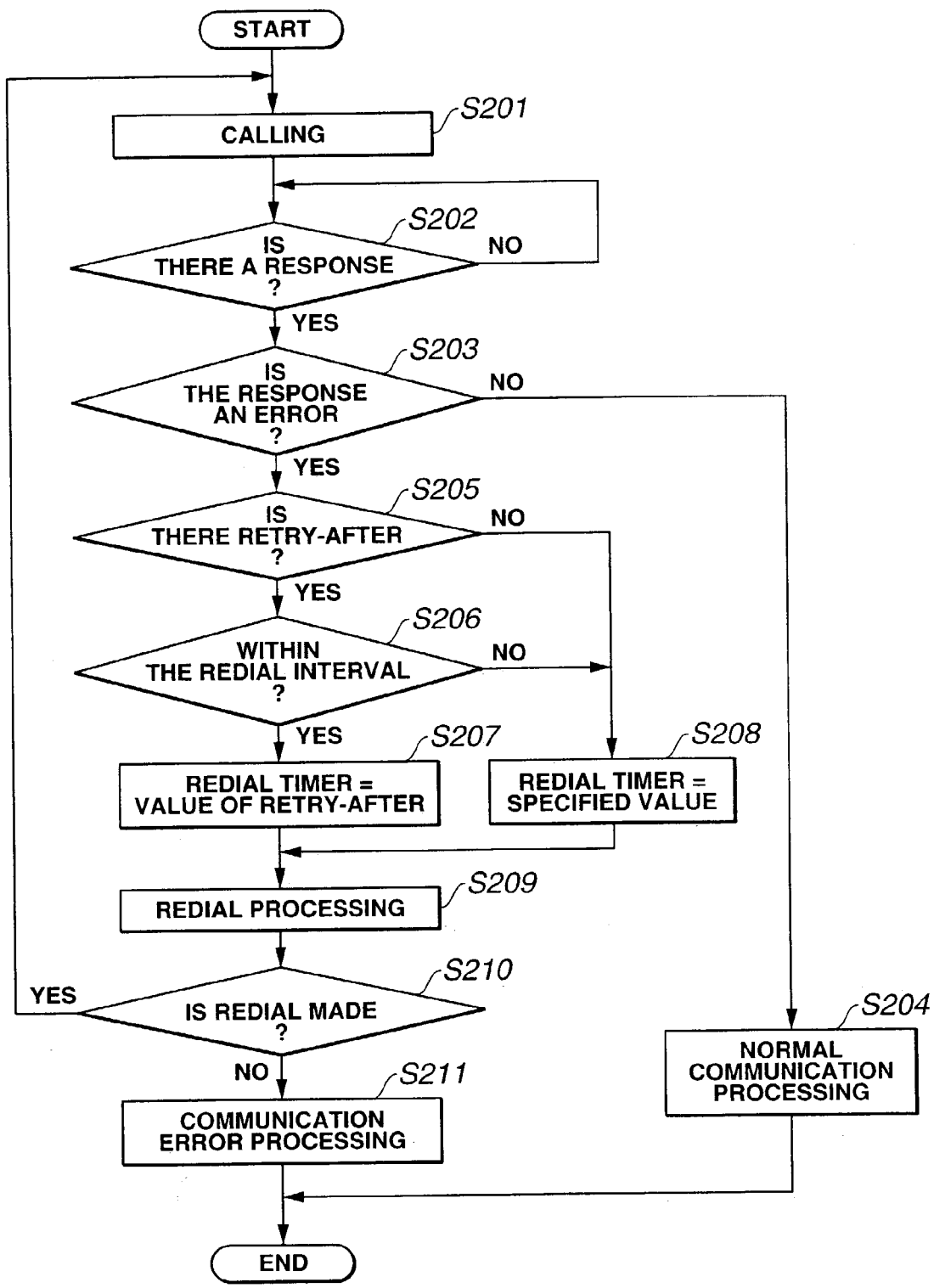
FIG. 6 is a flow chart showing a redial control operation according to a second embodiment.

FIG. 6 is a flow chart showing a redial control operation of the facsimile machine according to a second embodiment.

When operating as the calling terminal 10A as shown in FIG. 4, the facsimile machine 10 of the second embodiment performed the same processing in steps S201 to S205 shown in FIG. 6 as in the steps S101 to S105 shown in FIG. 5 executed by the facsimile machine 10 according to the first embodiment.

The facsimile machine 10 according to the second embodiment checks in step S205 whether a response signal such as code 486 (Busy Here) or the like which was judged as a response error in the step S203 has Retry-After, and when there is not Retry-After (NO in step S205), it is instructed to the redial control section 22.

According to the instructions, the redial control section 22 sets the redial timer to a prescribed value (90 seconds in FIG. 3) (step S208) and moves to redial processing (step S209).

When there is Retry-After in step S205 (YES in step S205), the redial control is entrusted to the redial control section 22.

Here, the redial control section 22 recognizes time t from Retry-After t and determines redial intervals (see FIG. 3) previously registered in the redial management section 23 as minimum and maximum values to check whether it is within the redial intervals (step S206).

Here, when it is not within the redial intervals (No in step S206), the redial timer is set to a prescribed value (step S208) in the same way as in the judgment of NO in the step S205 (there was not Retry-After), and the procedure moves to redial processing (step S209).

In the redial processing after the judgment NO in step S205 and NO in step S206, the redial control section 22 monitors the results of counting the prescribed value. And, when it is decided to "make a redial" as the prescribed value is counted up (YES in step S210), the procedure returns to the step S201 to make a call (redial).

Meanwhile, when it does not exceed the redial intervals (YES in step S206), the redial control section 22 sets the redial timer to a value of time t of Retry-After t (step S207) and moves to redial processing (step S209).

In the redial processing, the redial control section 22 monitors the results of counting the set time t. And, when the time t is counted up to decide to "make a redial" (YES in step S210), the procedure returns to the step S201 to make a call (redial).

When it is judged not "to make a redial" in the step S210 (NO in step S210), it is notified to the system control section 18, error processing (step S211) is performed, and a series of processing is completed.

In the flow chart shown in FIG. 6, when there is Retry-After t in the response and it is judged to be out of the redial interval from the results of comparison of the time t and the minimum and maximum values registered in the redial management section 23, the redial timer is set to a prescribed value to make a redial, but even when the response has an unanalyzable content, the redial control can be made by the prescribed value in the same way as described above.

In the facsimile machine 10 of the second embodiment for making the redial control, for example, when the redial management section 23 has registered redial interval information of maximum value=10800 seconds (3 hours) and minimum value=0 second, it is assumed that the calling terminal 10A has received a response 486 (Busy) "Retry-After 18000" from the called terminal 10B.

In this case, the redial control section 22 refers to the maximum and minimum values stored in the redial management section 23. Because 18000 (seconds) is larger than the maximum value (18000>10800), it is judged not within the redial intervals in step S206 (NO in step S206), and the redial timer is set to a specified value (step S208).

Then, the results of counting of the prescribed value are monitored by the redial processing of the step S206, and then the specified value is counted up and it is decided to make "redial" (YES in step S210), the procedure returns to the step S201 to make a call (redial).

Thus, in the facsimile machine 10 of the second embodiment, the redial management section 23 registers the minimum and maximum values of redial intervals, and after making a call, if the response sent back from the called terminal includes redial information, the redial timer is set to the prescribed value and a redial is made when the redial information is out of the redial intervals or the response has an unanalyzable content.

As described in connection with the effects of the first embodiment, when the value of redial information is larger than the maximum value of redial interval (e.g., three days later), it is useless to make a redial when it was an urgent FAX. But, there is a possibility that it is connected when redialed after a lapse of the prescribed value as in the second embodiment, and the probability of success in communication can be increased.

And, when the redial information has an unanalyzable content, the state of the called terminal cannot be known but it does not always mean that the called terminal is busy.

In the second embodiment, the above-described case is not determined as a communication error but a redial is made after a lapse of prescribed time, and a probability of success in communication can be increased.

Third Embodiment

Figure 7:
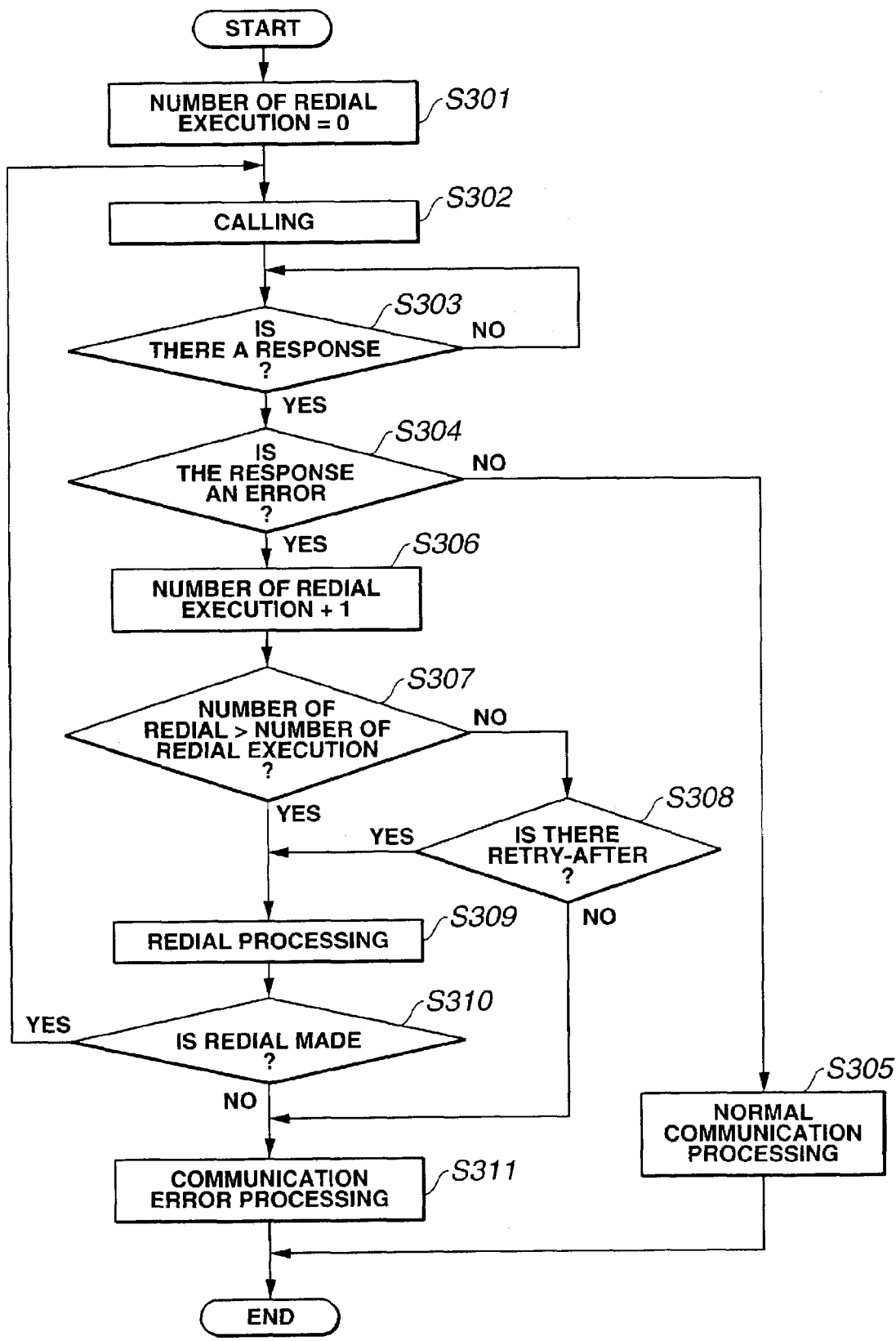
FIG. 7 is a flow chart showing a redial control operation according to a third embodiment.

FIG. 7 is a flow chart showing a redial control operation of the facsimile machine according to a third embodiment.

In the facsimile machine 10 of the third embodiment, when operating as the calling terminal 10A as shown in FIG.

4 and when the redial management table 230 (see FIG. 3) of the redial management section 23 is set to have a number of redialing=n (3 in this case), if error information from the called terminal satisfies the prescribed conditions, redial is made exceeding the determined number of times.

In the facsimile machine 10 according to the third embodiment, the SIP call control section 20 resets the number of redial execution to "0" (step S301) and makes a call to the destination terminal (called terminal) according to the SIP call control procedure as shown in FIG. 4 (step S302).

Then, it is monitored whether there is a response from the called terminal to the INVITE sent out when the call was made (step S303).

Here, when there is a response (YES in step S303), it is checked whether it is a response error or not with reference to the code data on the response (step S304).

Here, when it is judged not a response error (NO in step S304), normal call control is made to establish a call to perform normal communication processing (step S305).

And, when a response code such as 486 (Busy Here) or the like is received, it is judged to be a response error (YES in step S304), and redial control is entrusted to the redial control section 22.

In this embodiment, a response code which is received before the number of redial execution exceeds the prescribed number of times is determined to be free from Retry-After.

The redial control section 22 which is entrusted to make redial control adds "1" to the number of redial execution (step S306), and it is checked whether the number of redial execution is smaller than the prescribed number of redialing (prescribed value) (step S307).

Here, when the number of redial execution is smaller than the prescribed value (YES in step S307), the procedure moves to the redial processing (step S309).

In this redial processing, the redial control section 22 monitors the count of the redial timer (specified value), and when it is decided to make "a redial" upon the counting up of the redial timer (YES in step S310), the procedure returns to the step S302 to make a call (redial).

The above-described redial control is continued until the judgment NO (no response error) in the step S304 is obtained or the judgment NO (the number of redial execution exceeds the prescribed number of times) in the step S307 is obtained.

Meanwhile, when it is judged in the step S304 that there is a response error and it is judged in the step S307 that the number of redial execution exceeds the prescribed number of times (NO in step S307), it is checked whether a response code such as 486 (Busy Here) or the like, which was received at the call (the last call in the prescribed number of times) and was the cause of the judgment as a response error in the step S304, has Retry-After (step S308).

Here, when there is not Retry-After (NO in step S308), the redial control section 22 notifies it to the system control section 18, executes communication error processing (step S311) and terminates the processing.

If there is Retry-After (YES in step S308), the redial control section 22 proceeds to redial processing (step S309) even though the number of redial execution exceeds the prescribed number of times (NO in step S307).

In the redial control, the redial control section 22 sets the redial timer to time t of Retry-After t and monitors the results of counting of the set time t. And, when the time t is counted up and it is decided that "redial" is made (YES in step S310), the procedure returns to the step S302, and a call (redial) is made.

After making the call, when it is judged that there is no response error in the step S304 (NO in step S304), a call is established by making normal call control, and normal communication processing is performed (step S305).

In the facsimile machine 10 of the third embodiment for the redial control, it is assumed that the redial control section 22 makes a redial three times according to the setting of the number of redialing=3 of the redial management table 230, after redialing for the first and second times, a response code 486 (Busy Here) or the like free from Retry-After is received, and after redialing for the third time, a response code such as 486 (Busy Here) or the like containing Retry-After is received.

In this case, the redial control section 22 recognizes in step S307 that the number of redial execution exceeds the prescribed number of times (NO in step S307), it is recognized in step S308 that there is Retry-After (YES in step S308), and redial can be made after a lapse of time t of the Retry-After.

Thus, in the facsimile machine 10 of the third embodiment, redial is performed for a prescribed number of times (prescribed number of redialing) because of the generation of any response error (reception of a response code free from Retry-After) after making a call. When a response sent back from the called terminal at the last redial includes redial information (Retry-After), it is controlled to make a redial more than the prescribed number of times.

According to the above-described dial control, when an effective value is in redial information from the called terminal even after exceeding the number of redialing (specified value), a probability of success in communication can be improved by redialing furthermore.

Fourth Embodiment

Figure 8:
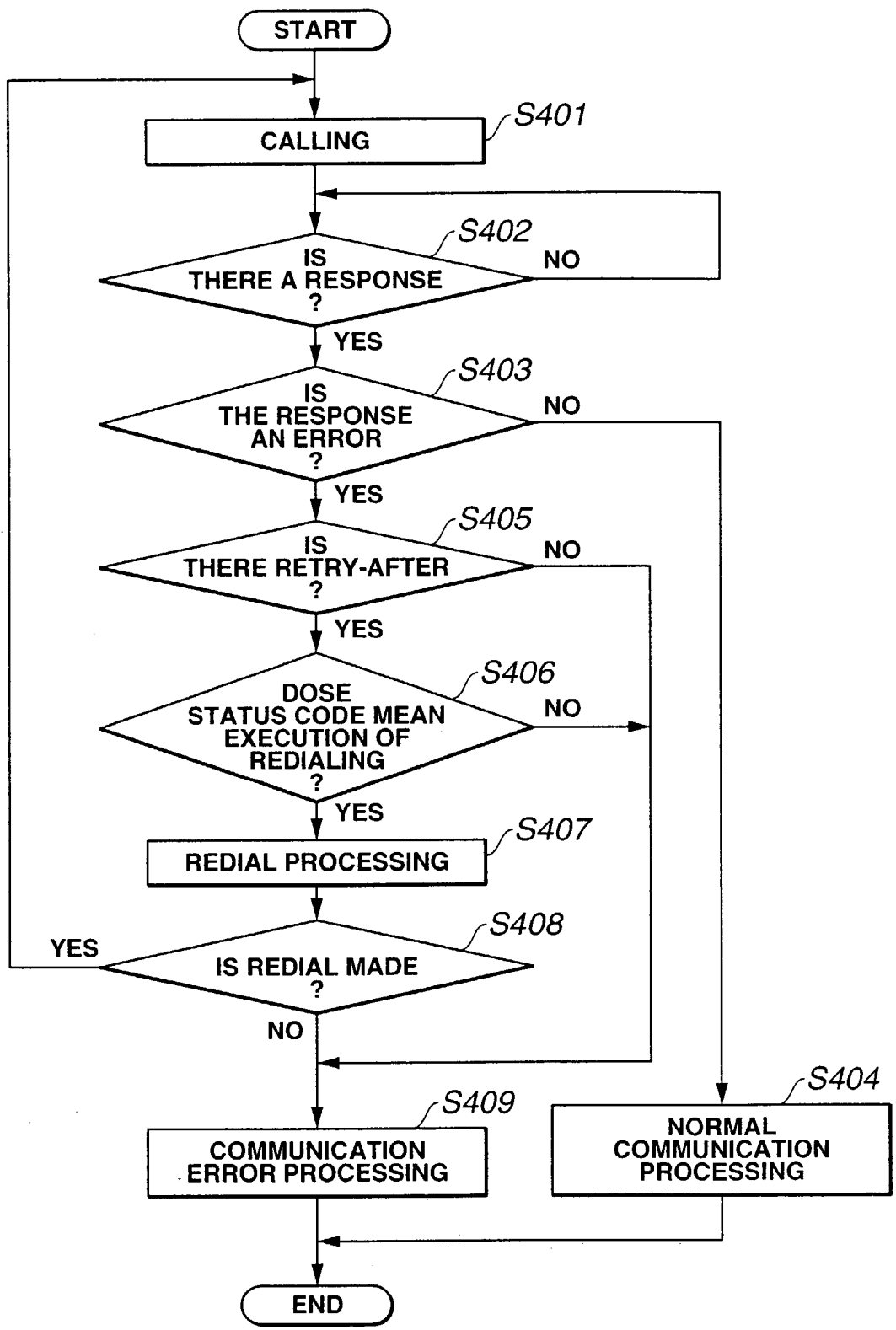
FIG. 8 is a flow chart showing a redial control operation according to a fourth embodiment.

FIG. 8 is a flow chart showing a redial control operation of the facsimile machine according to a fourth embodiment.

In the facsimile machine 10 according to the fourth embodiment, when operating as the calling terminal 10A as shown in FIG. 4, the SIP call control section 20 makes a call to the destination party (called terminal) according to the SIP call control procedure as shown in FIG. 4 (step S401).

Then, it is monitored whether there is a response from the called terminal in response to the INVITE sent out at the time of the call (step S402).

Here, when there is a response (YES in step S402), it is checked whether it is a response error or not with reference to code data of the response (step S403).

Here, when it is judged that it is not a response error (NO in step S403), normal call control is performed to establish the call, and normal communication processing is performed (step S404).

Meanwhile, when a response code such as 486 "Busy Here" or the like is received and it is judged as a response error (YES in step S403), it is checked whether there is Retry-After (step S405).

Here, when there is not Retry-After (NO in step S405), it is noticed to the system control section 18, and communication error processing corresponding to the response error is performed (step S409).

As the communication error processing, for example, the generation of the response error according to a response code contained in the response received then is shown in the operation/display section 12.

Meanwhile, when there is Retry-After (YES in step S405), the redial control is entrusted to the redial control section 22.

Here, the redial control section 22 analyzes the status code of the response having Retry-After to judge whether the status code indicates the execution of redial (step S406).

In this case, the redial control section 22 has registered redial execution conditions which specify to make redial by receiving the status code based on its ordinal position for example, and it is judged whether the execution of redial is indicated by referring to the redial execution conditions and the received response's status code.

Here, when the status code does not indicate that the redial must be made (NO in step S406), it is noticed to the system control section 18, communication error processing (step S409) is performed, and processing is terminated.

In this connection, when the status code indicates that the redial must be made (YES in step S406), the procedure moves to redial processing (step S407).

In the redial processing, the redial control section 22 sets the redial timer to a value of time t of Retry-After t and monitors the results of counting the set time t.

When the time t is counted up and it is decided to make "redial" (YES in step S408), the procedure returns to the step S401 to make a call (redial).

The above-described redial control is continued until judgment of NO (no response error) in the step S403 is obtained or judgment of NO (the number of redial execution exceeds the prescribed number of times) in the step of S408 is obtained.

Meanwhile, when it is judged in step S403 that it is not a response error (NO in step S403), a call is established through normal call control, and normal communication processing is performed (step S4049.

And, when it is judged in the step S403 that there is a response error but it is judged not to make redial as the number of redial execution exceeds the prescribed number of times in step S408 (NO in step S408), it is noticed to the system control section 18, communication error processing (step S409) is performed, and processing is terminated.

In the facsimile machine 10 according to the fourth embodiment to perform the above-described redial control, it is considered that redial execution conditions are determined to execute redialing upon receiving status codes of 400's among the status codes shown in FIG. 2 from the called terminal.

In the facsimile machine under the above-described set conditions, when 486 (Busy) which is for example Retry-After t (=180:3 minutes) is received in step S402, the status code is checked in step S406, and when the status code is 400's, it is judged that the status code indicates the execution of redial (YES in step S406), and redial can be made after a lapse of three minutes after judgment as a response error via the steps S408 and S409 according to Retry-After t (=180:3 minutes) included in the status code.

As shown in FIG. 2, the status codes of 400's are errors from the called terminal, and there is a high possibility of establishment of communications in the redial control of this embodiment which makes redial upon receiving the status codes of 400's.

Meanwhile, a status code of other than 400's has a high possibility of an error on the server side or the IP network as a whole, so that an effect is higher than making a redial by, for example, indicating a server-side error in the communication error processing in step S409 and urging the user whether or not making sure if FAX can be sent to the called terminal.

In the above embodiment, when there is Retry-After, it is determined to make a redial or not depending on the response code based on its ordinal position, but it may be configured to decide to make a redial depending on the number of response codes without depending on the presence or not of Retry-After.

Thus, in the facsimile machine 10 of the fourth embodiment, when redial information is contained in the response sent back from the called terminal after making a call, it is judged from the status code contained in the response to make a redial or not.

According to the redial control, when it can be judged that communications cannot be made even if a redial is made judging from the status code contained in the response, it is determined as a communication error, so that unnecessary dialing can be eliminated, and it can be noticed to the calling party soon that communication cannot be made.

Fifth Embodiment

Figure 9:
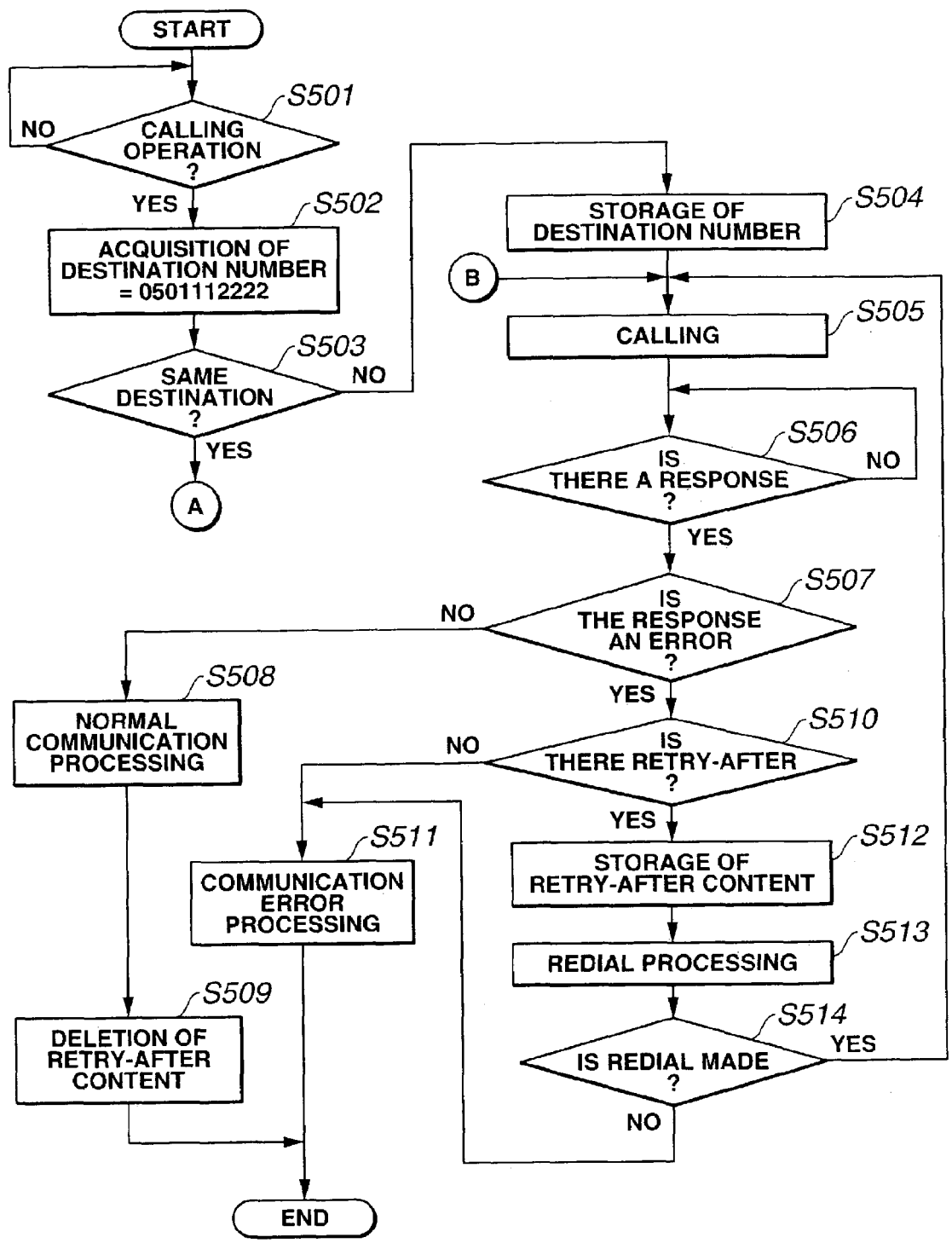
FIG. 9 is a flow chart showing a redial control operation according to a fifth embodiment.
Figure 10:
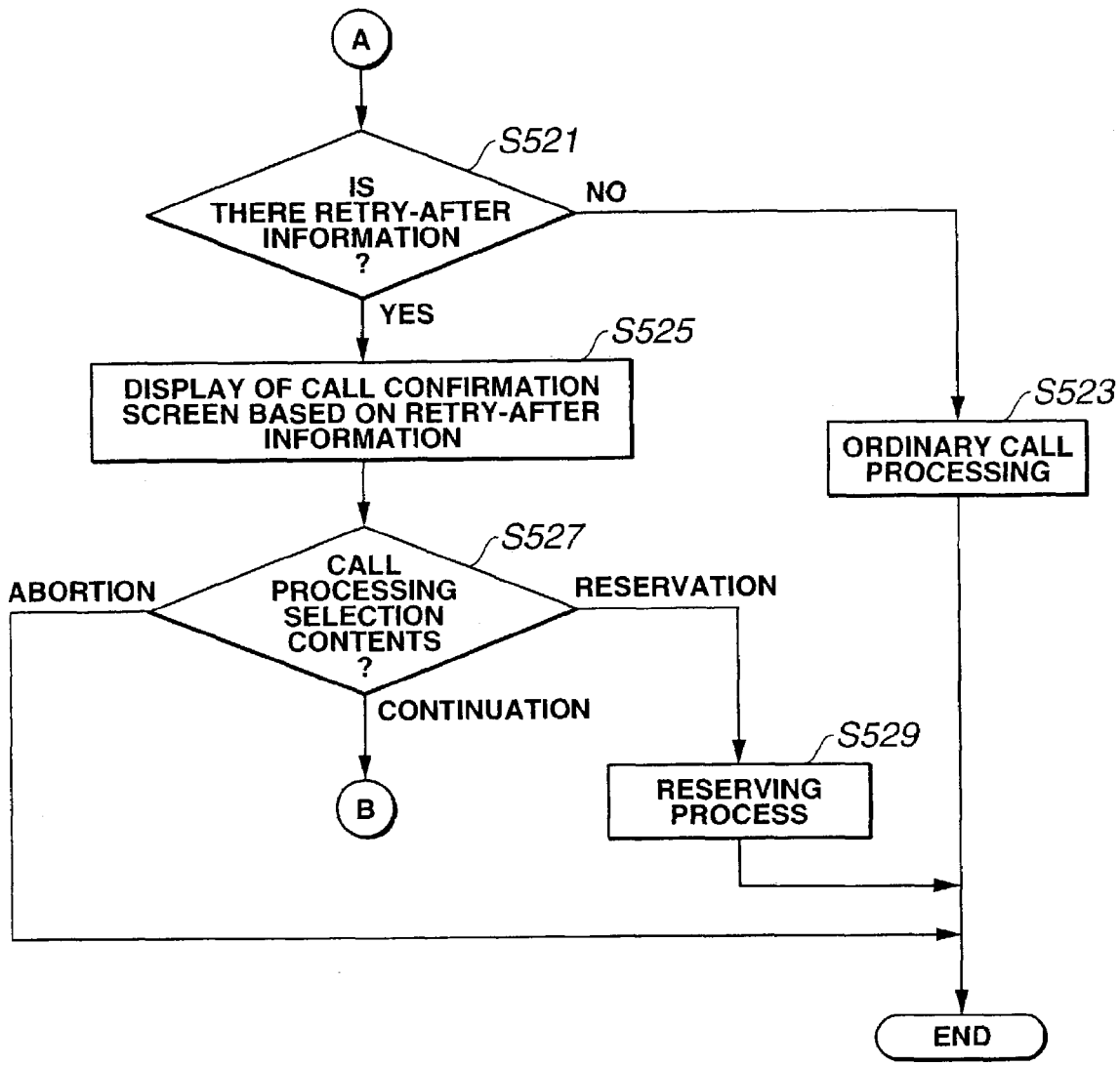
FIG. 10 is a flow chart showing a redial control operation from NO in the step S503 of FIG. 9.

FIG. 9 and FIG. 10 are flow charts showing redial control operations of the facsimile machine according to the fifth embodiment. Particularly, FIG. 10 is a flow chart showing a processing operation after judgment of NO in step S503.

In the facsimile machine according to the fifth embodiment, when a calling operation to the called terminal is made on the operation/display section 12 (step S501), the redial control section 22 obtains a number (destination number) of other terminal input by the calling operation (step S502).

Then, the redial control section 22 searches a receiving redial information area secured in the redial management table 230 of the redial management section 23 using the above destination number as a key to check whether there is the same destination (step S503).

Here, when there is not the same destination (NO in step S503), the redial control section 23 instructs that the destination number is stored into the receiving redial information area (see FIG. 3) of the redial management table 230 (step S504), the destination number is given to the SIP call control section 20 and a call is made.

According to the destination number and the calling instructions, the SIP call control section 20 makes a call to the destination terminal (called terminal) according to the SIP call control procedure shown in FIG. 4 (step S505).

Then, it is monitored whether there is a response from the called terminal to the INVITE sent out at the time of calling (step S506).

When there is a response (YES in step S506), it is checked whether it is a response error or not with reference to the code data of the response (step S507).

Here, when it is judged not to be a response error (NO in step S507), normal call control is performed to establish a call, and normal communication processing is performed (step S508).

At that time, if Retry-After information corresponding to the destination number is stored in the receiving redial information area of the redial management table 230, it is deleted (step S509).

When a response code such as 486 (Busy Here) or the like is received and it is judged as a response error (YES in step S507), it is checked whether there is Retry-After (step S510).

Here, when there is not Retry-After (NO in step S510), it is noticed to, for example, the system control section 18, communication error processing corresponding to the response error is performed (step S511), and processing is terminated.

As the communication error processing, it is for example shown on the operation/display section 12 that the response error has occurred according to a response code (see FIG. 2) contained in the received response.

Meanwhile, when there is Retry-After (YES in step S510), the redial control is entrusted to the redial control section 22.

The redial control section 22 which is entrusted to perform redial control stores the content of the Retry-After information into the receiving redial information area (see FIG. 3) of the redial management table 230 (step S512).

For example, "Retry-After 3600" received from the destination number and the received time are stored in association with the destination number (0501112222) stored in step S504 within the receiving redial information storage area of the redial management table 230 shown in FIG. 3.

After the content of the Retry-After information is stored, the redial control section 22 starts redial processing (step S513).

In this redial processing, the redial control section 22 sets the redial timer to a value of time t of Retry-After t and monitors the results of counting of the set time t.

And, when it is decided to make "redial" by counting up the time t (YES in step S514), the procedure returns to the step S505 to make a call (redial).

The above redial control is continued until it is judged NO in the step S507 (no response error) or it is judged NO in the step S514 (the number of redial execution exceeds the predetermined number of times).

Meanwhile, when it is judged in step S507 that it is not a response error (NO in step S507), a call is established through normal call control to perform normal communication processing (step S508).

At that time, if Retry-After information is stored in the receiving redial information area of the redial management table 230, it is deleted (step S509).

And, when it is judged in the step S507 that there is a response error and it is judged in step S514 that "redial is not made" when the number of redial execution exceeds the prescribed number of times (No in step S514), it is noticed to the system control section 18, communication error processing (step S511) is performed, and processing is terminated.

Meanwhile, if there is the same destination in the step S503 (YES in step S503), the procedure advances to the processing of step S521 and later as shown in FIG. 10.

In step S521, the redial control section 22 checks whether there is Retry-After information in receiving redial information area corresponding to the destination number which is judged in the step S503 to have the same destination in the receiving redial information area of the redial management table 230.

Here, when there is not Retry-After information (NO in step S521), it is instructed to the SIP call control section 20 to perform ordinary calling processing (step S523).

This ordinary calling processing can be realized by the procedures of the steps S505 to S514 shown in FIG. 9 for example.

Meanwhile, when there is Retry-After information (YES in step S521), the redial control section 22 uses the Retry-After information whose presence is checked in the step S521 to show a call confirmation screen 121 on the panel of the operation/display section 12. (step S525).

The call confirmation screen 121 (see FIG. 11) will be described in detail later and its display content consists of messages which notify that a corresponding destination is in an incoming call unacceptable state as a result of termination in error and a button indication for selection of abortion, continuation or reservation of the calling.

The calling party can know on the shown call confirmation screen 121 that the destination is not available to receive and can select the abortion, continuation or reservation of the call to the destination.

After the call confirmation screen 121 is shown in the above step S525, the redial control section 22 judges the call processing selection content on the call confirmation screen 121 by the calling party (step S527).

Here, when the abortion of calling is selected (Abortion in step S527), calling is aborted, and processing is terminated.

When the continuation of calling is selected (Continuation in step S527), the procedure proceeds to step S505, and call control is continued.

When the reservation of calling is selected (Reservation of step S527), calling is reserved (step S529), and processing is terminated.

It is considered that in the facsimile apparatus 10 according to the fifth embodiment for performing the redial control, calling is made to the called terminal of destination number=0501112222, there is a response of redial information (Retry-After 3600 (1 hour)), and a calling operation to the same terminal is made within the Retry-After time (1 hour).

In this case, when the first call is made, destination number=0501112222 of the called terminal is stored in the receiving redial information area of the redial management table 230 (see FIG. 3) in step S504.

After making a call, there is a response error sent back from the called terminal and it contains Retry-After 3600, so that in step S512, the Retry-After 3600 and its reception time are stored in the receiving redial information area corresponding to destination number=0501112222 of the redial management table 230 (see FIG. 3).

When normal communication can be made as a result of redialing based on the redial information (Retry-After 3600), the redial information is deleted in step S509.

Meanwhile, when a calling operation is made to the same destination number=0501112222 after a lapse of a prescribed time (e.g., 10 minutes) after the above-described reception time, it is judged in step S521 that there is (Retry-After 3600) corresponding to the destination number=, and the call confirmation screen 121 is shown in step S525.

FIG. 11 is a diagram showing an example of the call confirmation screen 121. This call confirmation screen 121 shows that a call to destination information (0501112222) was terminated in error 10 minutes ago, that the reception of a call within one hour is impossible, that selection whether or not processing is continued is urged, a calling continuation button "YES" button), a calling abortion button ("NO" button) and a calling reservation button ("RESERVATION" button.

When the calling party selects the "YES" button on the call confirmation screen 121, the procedure moves to step S505, and a call is started, and a call to select the "NO" button is aborted. When the "RESERVATION" button is selected, a call is reserved in step S529.

In the call confirmation screen 121, the specified time "10 minutes remaining" may be eliminated. In other words, it may be changed to more comprehensible words as long as the calling party can know it is a call to the same destination which was terminated in error.

And, "Calling unacceptable within one hour" shows the content interpreted from the redial information is shown in words comprehensive to the user. The redial information may be shown as it is or may be changed to another language.

Thus, the facsimile apparatus 10 according to the fifth embodiment has a receiving redial information storage area which stores a destination when a call was made to it and stores redial information contained in a response sent back from the called terminal after making the call, deletes the redial information when the redial was success, when a call is made to the same destination within the prescribed time before redialing, uses the redial information corresponding to the destination to notice that a call cannot be received because of termination in error, and shows the call confirmation screen 121 to urge the selection of subsequent call processing (abortion, continuation or reservation).

According to this redial control, redial information at the time when there was an error as a result of calling to a certain destination is stored, then when a call is made to the same destination later, the call confirmation screen 121 is shown according to the redial information received from the destination. The calling party at the time can know that the communication to the same destination was error, and it serves as a reference for the decision of the next measures.

For example, when it is an important FAX, it is made sure that the FAX was sent without fail, and the redial information shown as described above is effective information.

Sixth Embodiment

In the facsimile apparatus 10 according to the sixth embodiment, the destination which was called when the call was made is stored in the receiving redial information storage area together with the redial information contained in the response sent back from the destination after the calling was made, in the same way as the facsimile machine 10 of the fifth embodiment.

After that, when a call is made to the same destination in a redial standby state, destination information corresponding to the stored destination is shown, and the calling party decides whether the calling processing is continued or not.

Figure 12:
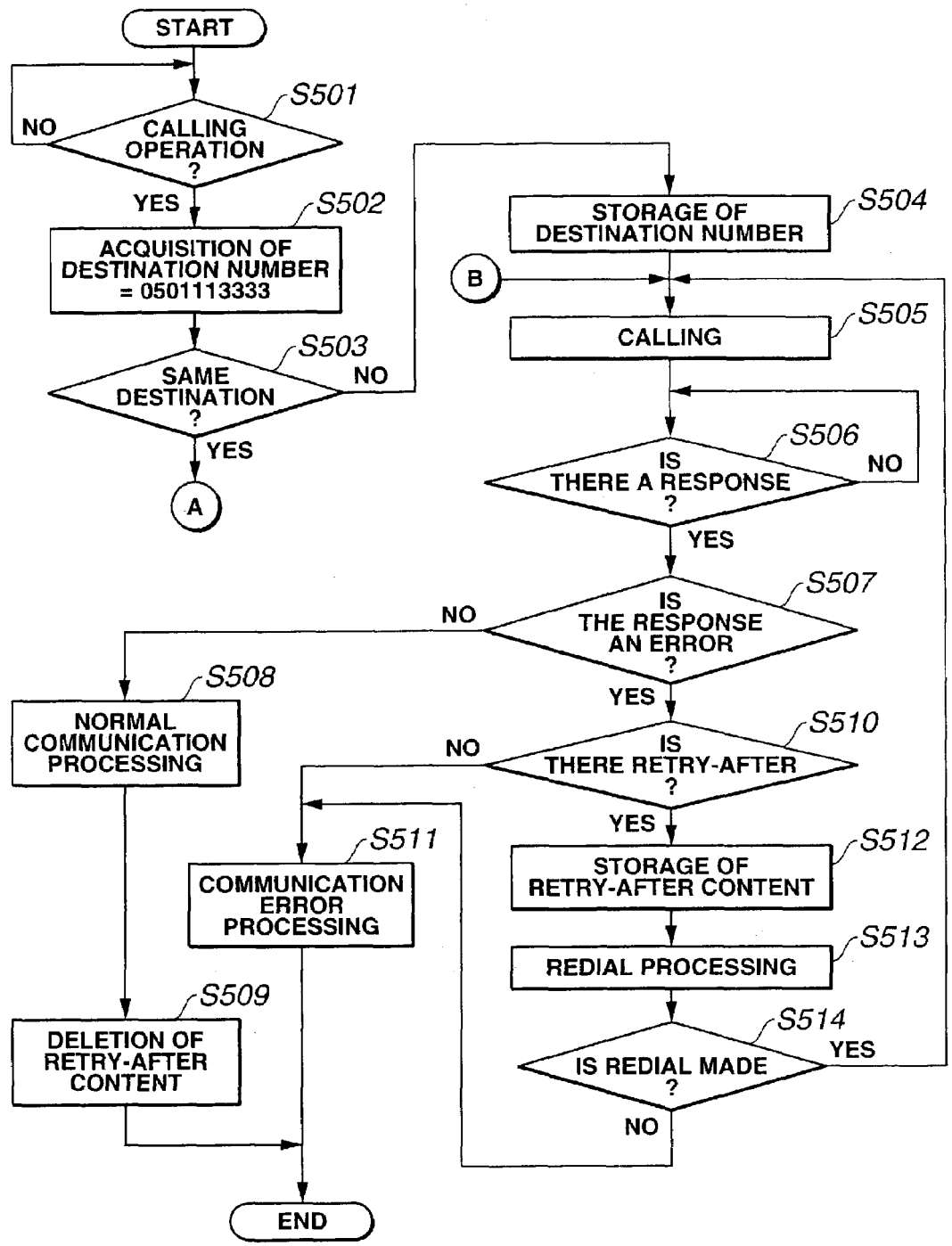
FIG. 12 is a flow chart showing a redial control operation according to the sixth embodiment.
Figure 13:
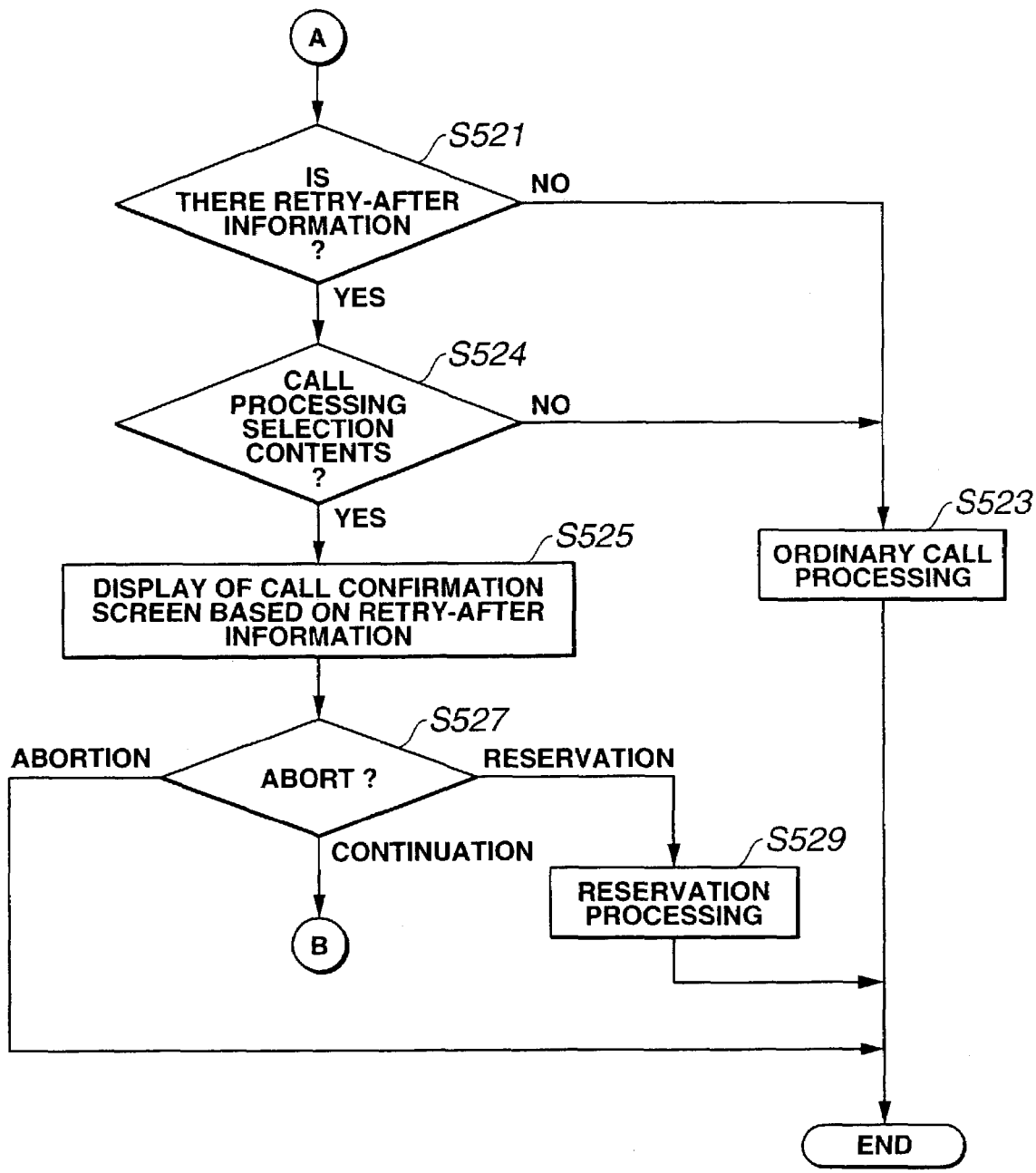
FIG. 13 is a flow chart showing a redial control operation from NO in the step S503 of FIG. 12.

FIG. 12 and FIG. 13 are flow charts showing a redial control operation of the facsimile machine 10 according to the sixth embodiment. Especially, FIG. 13 is a flow chart showing a processing operation after it was judged NO in the step S503 of FIG. 12.

The series of redial control processing shown in FIG. 12 by the facsimile machine 10 (when operating as the calling terminal 10A as shown in FIG. 4) according to the sixth embodiment is the same as the series of redial control processing by the facsimile machine 10 according to the fifth embodiment as shown in FIG. 9 except that the destination number to be obtained in the step S502 is different. Therefore, detailed description will be omitted.

Here, processing after judgment as the same destination in the step S503 of FIG. 12 will be described with reference to FIG. 13.

In the facsimile machine according to the sixth embodiment, when it is judged that there is the same destination (YES in step S503), the procedure proceeds to the processing operations of step S521 and later shown in FIG. 13.

In step 521, the redial control section 22 checks whether there is Retry-After information corresponding to the destination number which is judged to have the same destination in the above-described step S503 in the receiving redial information area of the redial management table 230.

Here, when there is no Retry-After information (NO in step S521), it is instructed to the SIP call control section 20 to perform normal calling processing (step S523).

This ordinary calling processing can be performed through the steps S505 to S514 shown in FIG. 12, for example.

Meanwhile, when there is Retry-After information (YES in step S521), the redial control section 22 checks whether the destination (the destination judged as the same destination in the above step S503) at that time is waiting for redialing (step S524).

Here, when the above described destination is not waiting for redialing (NO in step S524), the redial control section 22 instructs the SIP call control section 20 to perform ordinary calling processing (step S523).

Meanwhile, when the above-described destination is waiting for redialing (YES in step S524), the redial control section 22 uses the Retry-After information having checked the presence in the step S521 to show the call confirmation screen 125 on the panel of the operation/display section 12 (step S526).

The call confirmation screen 125 (see FIG. 14) will be described in detail later, and its display content comprises a message which notifies that the corresponding destination has terminated in error and in a state of waiting for redialing and a button display for selection of abortion, continuation or reservation of the calling.

The calling party can know on the shown call confirmation screen 125 that the destination is waiting for redialing and can select abortion, continuation or reservation of calling to the destination.

After the call confirmation screen 125 is shown in the step S526, the redial control section 22 judges the calling processing selection content on the call confirmation screen 125 by the calling party (step S527).

Here, when the abortion of calling is selected (abortion in step S527), calling is aborted, and processing is terminated.

When the continuation of calling is selected (continuation in step S527), the procedure proceeds to step S505, and the call control is continued.

When the reservation of calling is selected (reservation in step S527), calling is reserved (step S529), and processing is terminated.

In the facsimile machine 10 according to the sixth embodiment for performing the redial control, it is considered that when there is a response of redial information (Retry-After 3600 (1 hour)) by calling the called terminal of destination number=0501113333, and the calling operation to the same terminal is made within the Retry-After time (1 hour).

In this case, when calling for the first time, destination number=0501113333 of the called terminal is stored in the receiving redial information area of the redial management table 230 in step S504 (see FIG. 3).

After calling, there is a response error sent back from the called terminal and containing Retry-After 3600, so that the Retry-After 3600 and its reception time are stored in the receiving redial information area corresponding to the destination number=0501113333 of the redial management table 230 in step S512 (see FIG. 3).

When normal communication can be made as a result of redialing according to the above-described redialing information (Retry-After 3600), the redial information is deleted in step S509.

Meanwhile, when a calling operation is performed to the same destination number=0501113333 after a lapse of prescribed time (e.g., 10 minutes) from the above-described reception time, it is judged in step S521 that there is (Retry-After 3600) corresponding to the destination number=, it is judged in step S524 that the destination is waiting for redial, and the call confirmation screen 125 is shown in step S526.

FIG. 14 is a diagram showing an example of the call confirmation screen 125 at that time. The call confirmation screen 125 shows about destination information (0501113333) that error information was received at 10:30 and another communication is waiting for redial, that reception of a call is not available within one hour, urging of selection for continuation or not of processing, a call continuation button ("YES" button), and a call abortion button ("NO" button, and a call reservation button ("Reservation" button).

When the calling party selects the "YES" button on the call confirmation screen 125, the procedure proceeds to step S505, and calling is started, and calling to select the "NO" button is aborted. And, when the "Reservation" button is selected, calling is reserved in step S529.

On the call confirmation screen 125, the specified time such as 10:30 may be eliminated. In other words, a more plain language can be used as long as the calling party can know that a call cannot be made soon because the destination is waiting for redialing.

And, "reception of a call is not available within one hour" shows the content interrupted from the redial information into a language easier for the user. The redial information may be shown as it is or may be changed into another language.

Thus, the facsimile machine 10 according to the sixth embodiment has a receiving redial information storage area which stores the destination to which a call was made and stores redial information contained in a response sent back from the called terminal after making a call, when a call is made to the same destination within the prescribed time for redialing, uses the above redial information to notify that the destination is waiting for redialing, and shows the call confirmation screen 125 to urge the selection of the subsequent calling processing (abortion, continuation or reservation).

By this redial control, when a call is to be made to the called terminal which is waiting for redialing, the call confirmation screen 125 is shown, so that the calling party can know that transmission cannot be made soon, and the abortion, continuation or reservation of the calling processing can be urged.

Thus, the calling party can select to register (reserve) for transmission waiting if FAX is not urgent, or can select alternative measures such as transmission to another number if FAX is urgent, thereby contributing to improvement of operation efficiency of FAX communication.

It is to be understood that the present invention is not limited to the above description and the embodiments shown in the drawings, and various modifications may be made thereto within the true spirit and scope of the invention.

For example, the redial control of the facsimile machine was described in the above embodiments, but the present invention can be applied to general communication terminal device having a call control procedure using the SIP other than the facsimile machines.

What is claimed is:

1. A communication terminal device comprising:
an SIP call control unit which performs call control by using an SIP (Session Initiation Protocol);
a recognition unit which recognizes that a calling has become an error according to a response signal sent back from a called party terminal after making the call according to the SIP call control procedure;
a redial management unit which manages a redial interval to make a redial when the calling has become an error; and
a redial control unit which performs redial control according to redial information when the calling has become an error and the response signal contains the redial information wherein:
the redial management unit has a unit which stores a minimum value, a maximum value and a specified value related to the redial intervals, and
the redial control unit has a unit for redialing by using the specified value when time information indicative of a time period after which an incoming call can be accepted, that is contained in the redial information of the reponse signal, has a value other than the redial interval between the minimum value and the maximum value or the redial information has an unanalyzable content.

2. The communication terminal device according to claim 1, wherein:
the redial information includes time information indicative of a time period after which an incoming call can be accepted, and
the redial control unit has a unit for redialing by changing the redial interval according to the time information.

3. The communication terminal device according to claim 2, wherein the redial management unit has a unit for storing a minimum value and a maximum value related to the redial interval, and
the redial control unit has a unit which does not make a redial but processes as a communication error when the time information indicative of a time period after which an incoming call can be accepted, that is contained in the redial information, has a value other than the redial interval between the minimum value and the maximum value.

4. The communication terminal device according to claim 1, wherein:
the redial management unit has a unit which stores a specified value related to the number of redialing; and
the redial control unit has a unit which, when a calling has become an error and the response signal does not contain the redial information, performs redialing for a prescribed number of times according to the specified value, and when the redial information is contained in the response signal sent back from the party terminal at the last redialing, redials exceeding the prescribed number of times.

5. The communication terminal device according to claim 1, wherein the redial control unit comprises:
a unit for recognizing a status code contained in the response signal; and
a unit for judging whether or not the redialing is performed according to the status code.

6. The communication terminal device according to claim 1, wherein:
the redial management unit has a unit which stores destination information about a called party terminal and redial information contained in a response signal sent back from the called terminal after making the call; and
the redial control unit has:
a unit which removes redial information about the called terminal when the redial was success, and
a unit which, when making a call, displays a call confirmation screen by using the redial information when the redial information corresponding to the same destination number as the destination number of the called terminal is stored.

7. The communication terminal device according to claim 6, wherein:
the call confirmation screen has a message display which notifies that the called terminal corresponding to the destination number terminates in error and is in a call unacceptable state, and a button display which selects abortion, continuation or reservation of the call.

8. The communication terminal device according to claim 6, wherein:
the call confirmation screen has a message display which notifies that the called terminal corresponding to the destination number terminates in error and is in a redialing waiting state, and a button display which selects abortion, continuation or reservation of the call.

9. A method of controlling a communication terminal device for making call control by using an SIP (Session Initiation Protocol), comprising:
recognizing that a calling has become an error according to a response signal sent back from a called party terminal after making a call according to the SIP call control procedure;
managing a redial interval for redialing when the calling has become an error; and
making redial control according to redial information when the redial information is contained in the response signal when the calling has become an error, wherein:
a minimum value and a maximum value of the redial interval are stored, and when time information indicative of a time period after which an incoming call can be accepted, that is contained in the redial information of the response signal, is a value other than the redial interval between the minimum value and the maximum value, redialing is not made, and it is processed as a communication error.

10. The method of controlling a communication terminal device according to claim 9, wherein:
the redial information includes time information indicative of a time period after which an incoming call can be accepted, and
redialing is made by changing the redial interval according to the time information.

11. The method of controlling a communication terminal device according to claim 9, wherein:
a minimum value, a maximum value and a specified value related to the redial interval are stored, and
redialing is made by using the specified value when time information indicative of a time period after which an incoming call can be accepted, that is contained in the redial information, has a value other than the redial interval between the minimum value and the maximum value or when the redial information has an unanalyzable content.

12. The method of controlling a communication terminal device according to claim 9, wherein a specified value related to the number of redialing is stored, when a calling has become an error and the response signal does not contain the redial information, redialing is performed for a specified number of times according to the specified value, and when the redial information is contained in the response signal sent back from the called terminal at the last redialing, redialing is performed for more than the specified number of times.

13. The method of controlling a communication terminal device according to claim 9, wherein a status code contained in the response signal is recognized, and it is judged whether or not the redial is performed according to the status code.

14. The method of controlling a communication terminal device according to claim 9, wherein:
destination information of the called terminal and the redial information contained in the response signal sent back from the called terminal after making a call are stored,
redial information related to the called terminal is deleted when the redialing is success, and
a call confirmation screen is displayed by using the redial information when the redial information corresponding to the same destination number as that of the called terminal is stored when making a call.

15. The method of controlling a communication terminal device according to claim 14, wherein the call confirmation screen displays a message which notifies that the called terminal corresponding to the destination number has terminated in error and in a call unacceptable state, and a button for selection of abortion, continuation or reservation of the call.

16. The method of controlling a communication terminal device according to claim 14, wherein the call confirmation screen displays a message which notifies that the called terminal corresponding to the destination number terminates in error and in a redialing waiting state, and a button for selection of abortion, continuation or reservation of the call.

* * * * *